US012743629B2

(12) United States Patent
Yoon et al.

(10) Patent No.: US 12,743,629 B2
(45) Date of Patent: Sep. 22, 2026

(54) METHOD AND APPARATUS FOR TRAINING UNSUPERVISED CONDITIONAL GENERATIVE MODEL

(71) Applicant: Seoul National University R&DB Foundation, Seoul (KR)

(72) Inventors: Sungroh Yoon, Seoul (KR); Uiwon Hwang, Seoul (KR); Heeseung Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 610 days.

(21) Appl. No.: 18/204,457

(22) Filed: Jun. 1, 2023

(65) Prior Publication Data

US 2023/0394319 A1 Dec. 7, 2023

(30) Foreign Application Priority Data

Jun. 3, 2022 (KR) ........................ 10-2022-0068096
May 11, 2023 (KR) ........................ 10-2023-0060987

(51) Int. Cl.
*G06N 3/0475* (2023.01)
*G06N 3/094* (2023.01)

(52) U.S. Cl.
CPC ........... *G06N 3/094* (2023.01); *G06N 3/0475* (2023.01)

(58) Field of Classification Search
None
See application file for complete search history.

(56) References Cited

U.S. PATENT DOCUMENTS 12,230,014 B2 * 2/2025 Li ...................... G06V 10/7747
2020/0342362 A1 * 10/2020 Soni ..................... G06N 3/0442
2020/0401916 A1 * 12/2020 Rolfe .................. G06N 3/0455
2021/0256353 A1 * 8/2021 Nilsson .................. G06N 3/094
2022/0351530 A1 * 11/2022 Zaritsky .............. G06V 20/695
2023/0146468 A1 * 5/2023 Pal ....................... G06V 10/513 382/159
2023/0148015 A1 * 5/2023 Tripathi ................. G06N 3/044 706/12

(Continued)

FOREIGN PATENT DOCUMENTS

DE 102020214715 A1 * 5/2022 ............. G06N 3/084
KR 10-2020-0023049 A 3/2020
KR 10-2023-0016418 A 2/2023

(Continued)

OTHER PUBLICATIONS

U. Hwang et al., "Stein Latent Optimization for GANs," arXiv:2106.05319v1 [cs.LG] Jun. 9, 2021, available at https://arxiv.org/pdf/2106.05319v1.pdf, 27 pages.

(Continued)

*Primary Examiner* — Olabode Akintola
(74) *Attorney, Agent, or Firm* — NSIP Law

(57) ABSTRACT

Disclosed is a method of training a generative model capable of robustly training the generative model even when there is no label in training data, salient attributes are uneven, and there is only a small number of pieces of data labeled with a salient attribute desired to be learned, and is a method of training an unsupervised conditional generative model using a method of learning parameters of a latent distribution, a generative model, and an encoder.

20 Claims, 11 Drawing Sheets

(56) References Cited

U.S. PATENT DOCUMENTS

2023/0222176 A1* 7/2023 Honke .............. G06F 18/24143
702/19

FOREIGN PATENT DOCUMENTS

KR 20230016418 * 2/2023 ............... G06N 3/08
WO WO-2019157228 A1 * 8/2019 ............... G06N 7/01

OTHER PUBLICATIONS

U. Hwang et al., "Stein Latent Optimization for Generative Adversarial Networks," Sep. 29, 2021, published as a conference paper at the 10th International Conference on Learning Representations (ICLR), Apr. 25-29, 2022, 35 pages.
Bai, Junwen, et al., "Gaussian Mixture Variational Autoencoder with Contrastive Learning for Multi-Label Classification", International Conference on Machine Learning, arXiv:2112.00976v2, Jun. 10, 2022, (16 Pages in English).

* cited by examiner

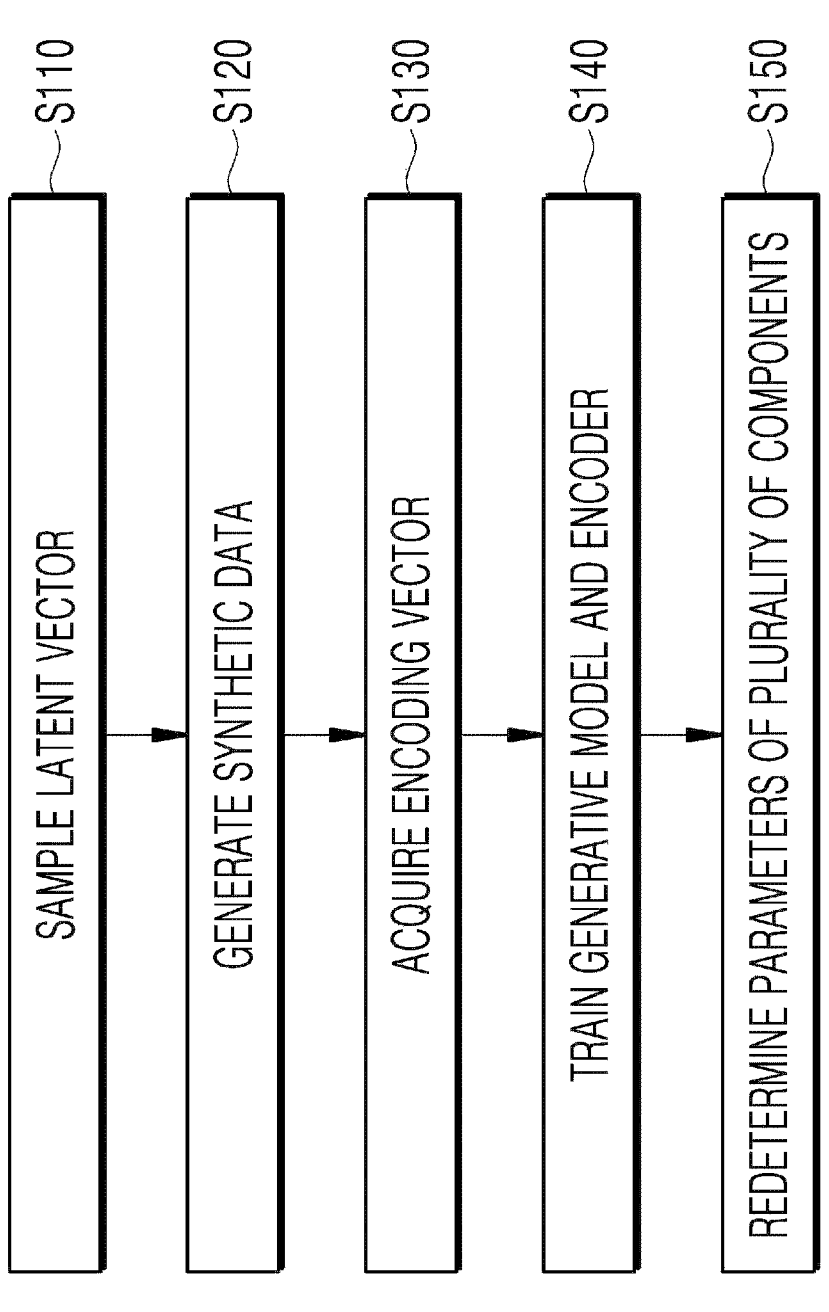
FIG. 1

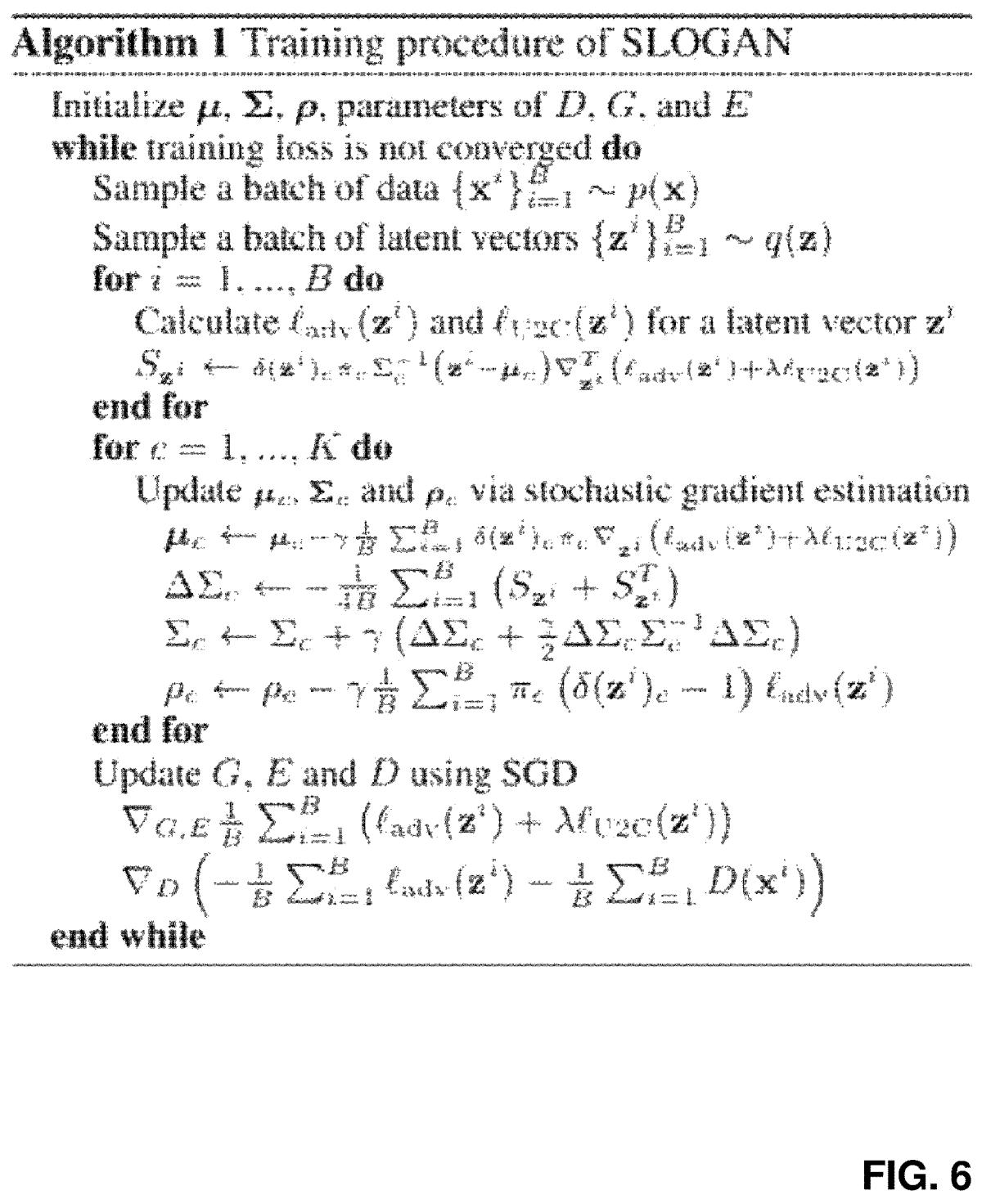

Algorithm 1 Training procedure of SLOGAN

Initialize $\boldsymbol{\mu}$, $\boldsymbol{\Sigma}$, $\boldsymbol{\rho}$, parameters of $D$, $G$, and $E$
while training loss is not converged do
  Sample a batch of data $\{\mathbf{x}^i\}_{i=1}^{B} \sim p(\mathbf{x})$
  Sample a batch of latent vectors $\{\mathbf{z}^i\}_{i=1}^{B} \sim q(\mathbf{z})$
  for $i = 1, \ldots, B$ do
    Calculate $\ell_{\mathrm{adv}}(\mathbf{z}^i)$ and $\ell_{\mathrm{U2C}}(\mathbf{z}^i)$ for a latent vector $\mathbf{z}^i$
    $S_{\mathbf{z}^i} \leftarrow \delta(\mathbf{z}^i)_c \pi_c \Sigma_c^{-1} (\mathbf{z}^i - \boldsymbol{\mu}_c) \nabla_{\mathbf{z}^i}^T (\ell_{\mathrm{adv}}(\mathbf{z}^i) + \lambda \ell_{\mathrm{U2C}}(\mathbf{z}^i))$
  end for
  for $c = 1, \ldots, K$ do
    Update $\boldsymbol{\mu}_c$, $\boldsymbol{\Sigma}_c$ and $\rho_c$ via stochastic gradient estimation
      $\boldsymbol{\mu}_c \leftarrow \boldsymbol{\mu}_c - \gamma \frac{1}{B} \sum_{i=1}^{B} \delta(\mathbf{z}^i)_c \pi_c \nabla_{\mathbf{z}^i} (\ell_{\mathrm{adv}}(\mathbf{z}^i) + \lambda \ell_{\mathrm{U2C}}(\mathbf{z}^i))$
      $\Delta\Sigma_c \leftarrow -\frac{1}{4B} \sum_{i=1}^{B} (S_{\mathbf{z}^i} + S_{\mathbf{z}^i}^T)$
      $\Sigma_c \leftarrow \Sigma_c + \gamma \left(\Delta\Sigma_c + \frac{\gamma}{2} \Delta\Sigma_c \Sigma_c^{-1} \Delta\Sigma_c\right)$
      $\rho_c \leftarrow \rho_c - \gamma \frac{1}{B} \sum_{i=1}^{B} \pi_c \left(\delta(\mathbf{z}^i)_c - 1\right) \ell_{\mathrm{adv}}(\mathbf{z}^i)$
  end for
  Update $G$, $E$ and $D$ using SGD
    $\nabla_{G,E} \frac{1}{B} \sum_{i=1}^{B} (\ell_{\mathrm{adv}}(\mathbf{z}^i) + \lambda \ell_{\mathrm{U2C}}(\mathbf{z}^i))$
    $\nabla_D \left(-\frac{1}{B} \sum_{i=1}^{B} \ell_{\mathrm{adv}}(\mathbf{z}^i) - \frac{1}{B} \sum_{i=1}^{B} D(\mathbf{x}^i)\right)$
end while

FIG. 6

Algorithm 3 Attribute manipulation

Initialize probe data with the desired attribute $\mathbf{X}_{c=1} \leftarrow \{\mathbf{x}^i_{c=1}\}_{i=1}^M$ and $\tilde{\mathbf{X}}_{c=1} \leftarrow \{\mathbf{x}^i_{c=1}\}_{i=1}^M$ Initialize probe data without the desired attribute $\mathbf{X}_{c=0} \leftarrow \{\mathbf{x}^i_{c=0}\}_{i=1}^M$ and $\tilde{\mathbf{X}}_{c=0} \leftarrow \{\mathbf{x}^i_{c=0}\}_{i=1}^M$ for each mixup iteration $t$ in $\{1, \ldots, T\}$ do

$\tilde{\mathbf{X}}_{c=1} \leftarrow \tilde{\mathbf{X}}_{c=1} \cup \textsc{Mixup}(\mathbf{X}_{c=1}, \textsc{Permute}(\mathbf{X}_{c=1}))$ $\tilde{\mathbf{X}}_{c=0} \leftarrow \tilde{\mathbf{X}}_{c=0} \cup \textsc{Mixup}(\mathbf{X}_{c=0}, \textsc{Permute}(\mathbf{X}_{c=0}))$ end for for each augmented data index $j$ in $\{1, \ldots, M(T+1)\}$ do

$\cos\theta^j_{00} \leftarrow E(\tilde{\mathbf{x}}^j_{c=0}) \cdot \boldsymbol{\mu}_0 / \|E(\tilde{\mathbf{x}}^j_{c=0})\| \|\boldsymbol{\mu}_0\|$ $\cos\theta^j_{01} \leftarrow E(\tilde{\mathbf{x}}^j_{c=0}) \cdot \boldsymbol{\mu}_1 / \|E(\tilde{\mathbf{x}}^j_{c=0})\| \|\boldsymbol{\mu}_1\|$ $\cos\theta^j_{10} \leftarrow E(\tilde{\mathbf{x}}^j_{c=1}) \cdot \boldsymbol{\mu}_0 / \|E(\tilde{\mathbf{x}}^j_{c=1})\| \|\boldsymbol{\mu}_0\|$ $\cos\theta^j_{11} \leftarrow E(\tilde{\mathbf{x}}^j_{c=1}) \cdot \boldsymbol{\mu}_1 / \|E(\tilde{\mathbf{x}}^j_{c=1})\| \|\boldsymbol{\mu}_1\|$ end for

$$\mathcal{L}_{\mathrm{m}} = -\frac{1}{M(T+1)} \sum_{j=1}^{M(T+1)} \log \frac{\exp(s\cdot\cos(\theta^j_{00}+m)) + \exp(s\cdot\cos(\theta^j_{11}+m))}{\exp(s\cdot\cos(\theta^j_{00}+m)) + \exp(s\cdot\cos\theta^j_{01}) + \exp(s\cdot\cos\theta^j_{10}) + \exp(s\cdot\cos(\theta^j_{11}+m))}$$

Minimize $\mathcal{L}^p$ with respect to $E$, $G$, and $\boldsymbol{\mu}$

FIG. 8

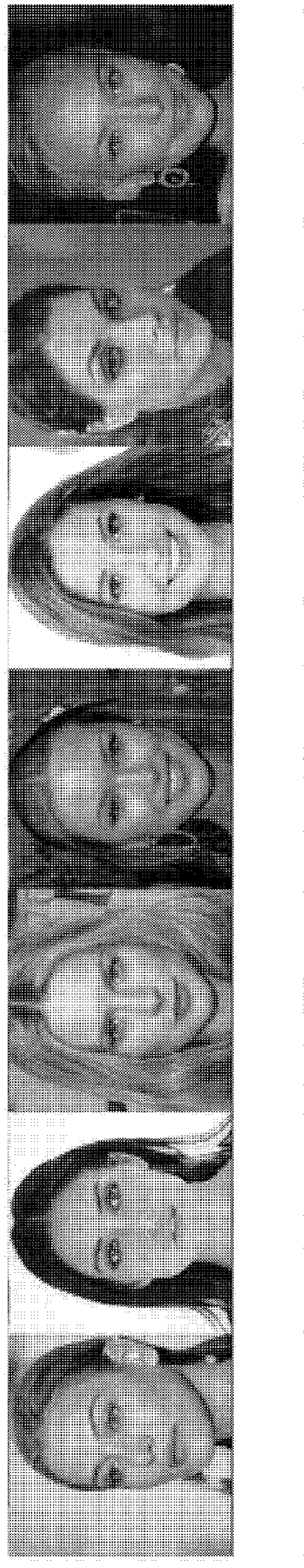
FIG. 9

METHOD AND APPARATUS FOR TRAINING UNSUPERVISED CONDITIONAL GENERATIVE MODEL

RELATED APPLICATIONS

This application claims priority to Korean Patent Application No. 10-2022-0068096, filed on Jun. 3, 2022, and to Korean Patent Application No. 10-2023-0060987, filed on May 11, 2023, the entirety of each of which is incorporated herein by reference.

BACKGROUND OF THE INVENTION

Field of the Invention

The present disclosure relates to a method and apparatus for training a generative model based on deep learning, and more particularly to a method and apparatus for robustly training a generative model using data when a label is not present and salient attributes are unevenly distributed in real data.

Description of the Related Art

A generative model is a noteworthy model in the field of artificial intelligence (AI) and is a model that generates new data from given data. Recently, generative models have significant advancements, and conditional generation that generates data corresponding to a specific class is possible. However, achieving this conditional generation typically demands a substantial quantity of labeled data. Unfortunately, the reality is that real data is frequently unlabeled or possesses only a few labels.

On the other hand, unsupervised conditional generative model can generate synthetic data by learning unlabeled attributes which exists in given data. However, conventional training methods for unsupervised conditional generative models assume that the salient attributes of real data are evenly distributed. In reality, though, most salient attributes of data found in the real world are unevenly distributed.

Therefore, for unsupervised learning for conditional generation, it is necessary to consider unevenly distributed salient attributes.

Patent Document 1: Korean Patent Publication No. 10-2023-0016418 (published on Feb. 2, 2023)

SUMMARY OF THE INVENTION

Therefore, the present invention has been made in view of the above problems, and it is an object of the present invention to provide a method and apparatus for training a generative model capable of effectively training the generative model even when a distribution of salient attributes in training data is uneven.

It is another object of the present invention to provide a method and apparatus for training a generative model capable of efficiently training the generative model using salient attributes through a small amount of labeled data.

The purpose of the present disclosure is not limited to the tasks mentioned above, and other purposes and advantages of the present disclosure not mentioned above may be understood by the following description, and may be more clearly understood by the embodiments of the present disclosure. In addition, it will be appreciated that the objects and advantages of the present disclosure may be realized by means and combinations thereof indicated in the claims.

In accordance with an aspect of the present invention, the above and other objects can be accomplished by the provision of a method of training an unsupervised conditional generative model, the method including defining distributions of a plurality of components including mean vectors, respectively, and sampling a latent vector from a latent distribution including the distributions of the plurality of components, generating synthetic data using the latent vector as input of the generative model, inputting the synthetic data to an encoder to acquire an encoding vector, training the generative model and the encoder based on a value of a loss function configured to make the synthetic data closer to real data, and redetermining parameters of the latent distribution based on the value of the loss function.

The loss function may be configured so that the encoding vector is closer to a mean vector of one component among the plurality of components and farther from mean vectors of the other components.

The method may further include encoding labeled data through the encoder when the labeled data is present, wherein the loss function may be configured so that the encoded labeled data is closer to a mean vector of at least one of the components and farther from mean vectors of the other components.

In accordance with another aspect of the present invention, there is provided an apparatus for training an unsupervised conditional generative model, the apparatus including a processor, and a memory operably connected to the processor to store at least one piece of code executed by the processor, wherein, when executed by the processor, the memory stores code causing the processor to define distributions of a plurality of components including mean vectors, respectively, and sample a latent vector from a latent distribution including the distributions of the plurality of components, generate synthetic data using the latent vector as input of the generative model, input the synthetic data to an encoder to acquire an encoding vector, train the generative model and the encoder based on a value of a loss function configured to make the synthetic data closer to real data, and redetermine parameters of the latent distribution based on the value of the loss function.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a flowchart for describing a method of training an unsupervised conditional generative model according to an embodiment of the present disclosure;

FIG. 6 illustrates illustrative pseudocode of a method of training the unsupervised conditional generative model according to an embodiment of the present disclosure;

FIG. 8 illustrates illustrative pseudocode of the method of training the unsupervised conditional generative model when labeled data is present according to an embodiment of the present disclosure; and FIG. 9 is image data generated by a generative model trained by a method of training an unsupervised conditional generative model introducing an attribute manipulation loss function when there is 30 images labeled as male and 30 images labeled as female according to an embodiment of the present disclosure, and illustrates the case where a ratio of males to females in training data is 1:1.7.

DETAILED DESCRIPTION OF THE INVENTION

Figure 2:
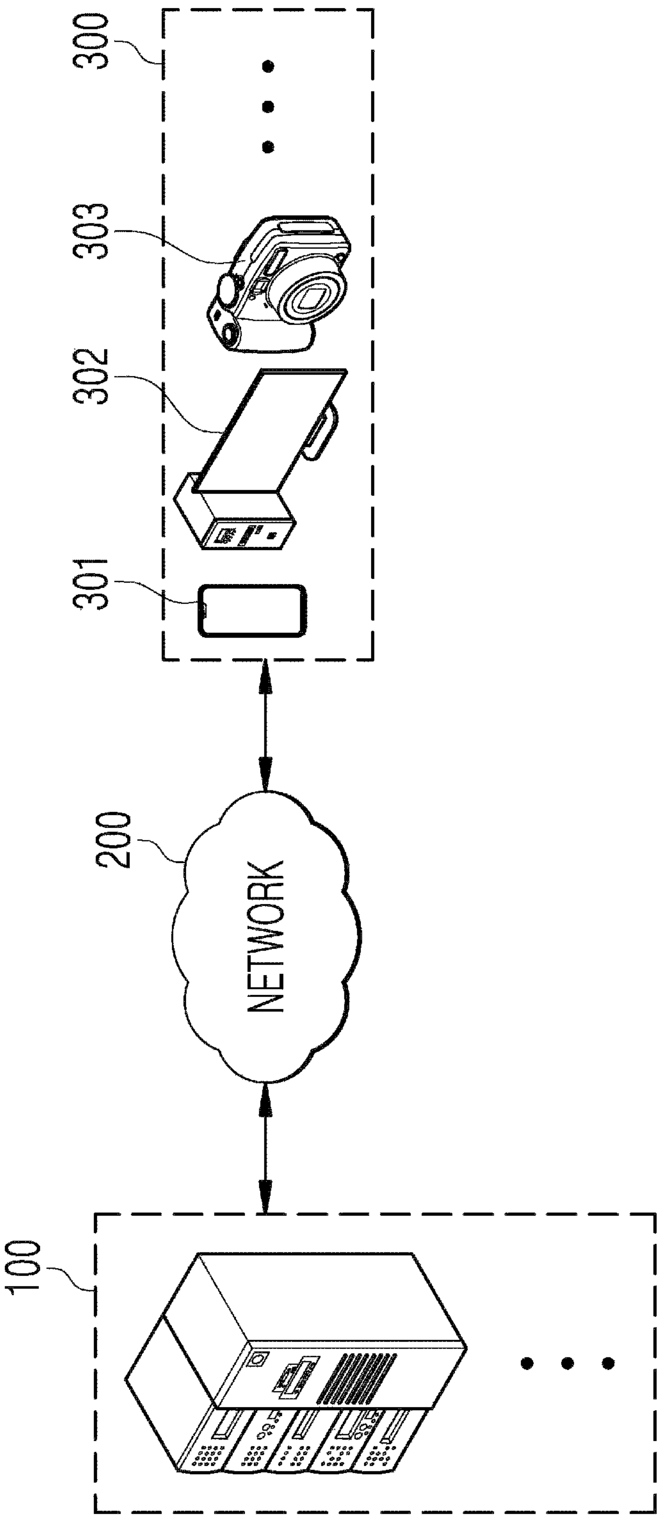
FIG. 2 is a diagram for describing a driving environment of an apparatus for training the unsupervised conditional generative model according to an embodiment of the present disclosure.

Hereinafter, embodiments disclosed in the present disclosure will be described in detail with reference to the accompanying drawings, and the same or similar elements will be given the same reference numerals regardless of reference symbols, and redundant description thereof will be omitted. In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of related publicly known technology may obscure the gist of the embodiments disclosed in the present specification, the detailed description thereof will be omitted. In addition, the accompanying drawings are only for easy understanding of the embodiments disclosed in this specification, the technical idea disclosed in this specification is not limited by the accompanying drawings, and it should be understood to embrace all modifications, equivalents, and substitutes within the spirit and scope of the present invention.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A method of training an unsupervised conditional generative model according to an embodiment of the present disclosure will be described with reference to FIG. 1.

The method of training the unsupervised conditional generative model according to the embodiment of the present disclosure may include step S110 of defining distributions of a plurality of components including mean vectors, respectively, and sampling a latent vector from a latent distribution including the distributions of the plurality of components, step S120 of generating synthetic data by using the latent vector as input of the generative model, step S130 of inputting the synthetic data to an encoder to acquire an encoding vector, step S140 of training the generative model and the encoder based on a loss function value configured to make the synthetic data closer to real data, and step S150 of redetermining parameters for the plurality of components based on the loss function value.

In step S110, the latent vector is sampled from the latent distribution.

The latent distribution may be defined as including the distributions of the plurality of components, and the distributions of the components include the respective mean vectors.

In the present disclosure, the distributions of the components constitute the latent distribution including the mean vectors, and may be updated by learning salient attributes in real data. In addition, by updating the latent distribution so that the distributions of the respective components approach the distribution of the salient attributes in the real data, this latent distribution may be made to reflect the salient attributes of the real data well.

A latent vector is an input value of a generative model, is sampled from a latent distribution, has a lower dimension than that of synthetic data generated by the generative model, and may include salient attributes of real data.

In one embodiment, the distributions of the components may be defined as continuous Gaussian distributions, and in this case, the latent distribution may be defined as a Gaussian mixture obtained by synthesizing the Gaussian distributions of the respective components.

Figure 3:
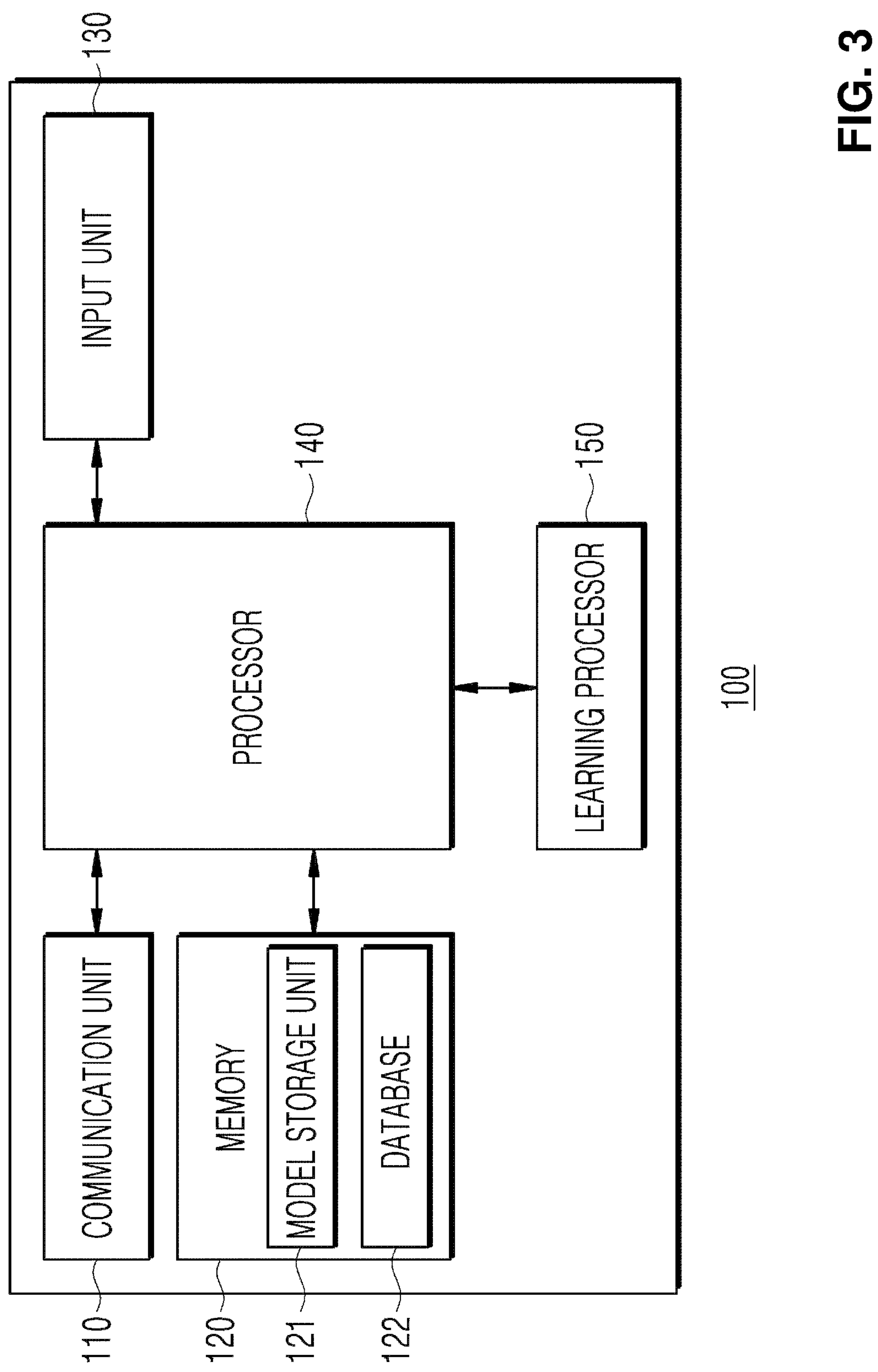
FIG. 3 is a block diagram for describing a configuration of the apparatus for training the unsupervised conditional generative model according to an embodiment of the present disclosure.

Learning of the latent distribution according to sampling of the latent vector will be described in detail below with reference to FIG. 3.

In step S120, synthetic data is generated by using the latent vector as input of the generative model. The generative model may generate high-dimensional synthetic data by receiving the latent vector defined as low-dimensional. The generative model may be a model that generates data as an existing generative model based on deep learning, and refers to a model that learns given real data or a distribution of the real data to generate new data similar to the real data. A structure of the generative model according to the embodiment of the present disclosure may utilize an existing generative model, and may utilize a Generative Adversarial Network (GAN), a Variational AutoEncoder (VAE), a diffusion model, etc.

In step S130, the synthetic data is input to the encoder to acquire the encoding vector. The encoder includes an artificial neural network, and may have a Convolutional Neural Network (CNN), Recurrent Neural Network (RNN), or Multi-Layer Perceptron (MLP) structure. Preferably, an encoder network may have a CNN structure when the learned real data is an image, an RNN structure when the learned real data is time series data, and an MLP structure when the learned real data is data including a table and a vector.

In step S140, the generative model and the encoder are trained based on a loss function value configured to make the synthetic data closer to the real data. A loss function is configured so that the distribution of the synthetic data is closer to the distribution of the real data, and may utilize a function based on an adversarially learned discriminant model when the generative model is based on the GAN and utilize the evidence lower bound (ELBO) obtained through variational inference when the generative model is based on the VAE.

In one embodiment, the loss function may be further configured so that the encoding vector is closer to a mean vector of one of the plurality of components and farther from mean vectors of the other components. In this instance, the one component may be determined based on responsibility of the sampled latent vector and the distributions of the plurality of components.

In step S150, the parameters for the plurality of components are redetermined based on the loss function value. By redetermining the parameters for the components, training may be performed so that the distributions of the components formed in the latent distribution become similar to the distribution of the salient attribute in the real data.

The method of training the unsupervised conditional generative model according to the embodiment may perform training using the latent distribution by using a method of iteratively performing some or all of step S110 to step S150 according to a predetermined termination requirement to iteratively train the generative model and the encoder, and redetermining the parameters for the distributions of the plurality of components. The predetermined termination requirement is determined based on a loss function, a parameter minimizing a value of the loss function is determined, and the process may be terminated.

A description will be given of a driving environment of an apparatus 100 for training the unsupervised conditional generative model according to an embodiment of the present disclosure with reference to FIG. 2.

The driving environment of the apparatus for training the unsupervised conditional generative model according to the embodiment of the present disclosure may include the training apparatus 100, a network 200, and an external terminal 300 including a terminal 301, a desktop computer 302, and a digital camera 303.

The training apparatus 100 may be a computing device including a processor and a memory operably connected to the processor. The training apparatus 100 is an apparatus for training the unsupervised conditional generative model and may be implemented as a computing device including a processor and memory. The training apparatus 100 may receive an artificial neural network model including a generative model, a discriminant model, etc. from the network 200, and may provide a generative model trained through the training apparatus 100 again. The external terminal 300 may receive a trained artificial neural network through the network 200, and may generate data through the artificial neural network.

A description will be given of a configuration of the training apparatus 100 according to an embodiment of the present disclosure with reference to FIG. 3.

The training apparatus 100 according to the embodiment may include a communication unit 110, a memory 120, an interface 130, a processor 140, and a learning processor 150.

The communication unit 110 may include a wireless communication unit or a wired communication unit. The wireless communication unit may include at least one of a mobile communication module, a wireless Internet module, a short-range communication module, or a location information module. The mobile communication module transmits and receives a radio signal with at least one of a base station, an external terminal, or a server on a mobile communication network constructed according to long term evolution (LTE), which is a communication method for mobile communication, etc. The wireless Internet module is a module for wireless Internet access, may be built into or provided outside the apparatus 100, and may use WLAN (Wireless LAN), Wi-Fi Direct, DLNA (Digital Living Network Alliance), etc. The short-range communication module is a module for transmitting and receiving data through short-range communication, and may use Bluetooth™, RFID (Radio Frequency Identification), infrared data association (IrDA), UWB (Ultra-Wideband), ZigBee, NFC (Near Field communication), etc.

The memory 120 may store software and may include a volatile or nonvolatile recording medium. In addition, the memory 120 is connected to one or more processors 140 through an electrical or internal communication interface, and when executed by the processor 140, and may store code that causes the processor 140 or the learning processor 150 to train a deep learning-based learning model.

Here, the memory 120 may include a non-temporary storage medium such as a magnetic storage medium or a flash storage medium, or a temporary storage medium such as a RAM. However, the scope of the present disclosure is not limited thereto. The memory 120 may include a built-in memory and/or an external memory, and may include a volatile memory such as a DRAM, an SRAM, or an SDRAM, a nonvolatile memory such as an OTPROM (one time programmable ROM), a PROM, an EPROM, an EEPROM, a mask ROM, a flash ROM, a NAND flash memory, or a NOR flash memory, a flash drive such as an SSD, a compact flash (CF) card, an SD card, a Micro-SD card, a Mini-SD card, an Xd card, or a memory stick, or a storage device such as an HDD.

In one embodiment, the memory 120 may include a model storage unit 121 and a database 122.

The model storage unit 121 stores a model (or artificial neural network) that is being trained or has been trained through the processor 140 or the learning processor 150, and stores an updated model when the model is updated through training. In this instance, the model storage unit 121 may classify trained models according to a training time, training progress, etc. into a plurality of versions as needed, and store the models.

The database 122 stores input data acquired from the communication unit 110 or the interface 130, training data as real data used for model training, a training history of the model, etc. The input data stored in the database 122 may be processed data suitable for model training as well as unprocessed input data.

The input unit 130 includes a user interface (UI) including a camera for inputting a video signal, a microphone for receiving an audio signal, and a touch interface for receiving information from a user, the user interface may include not only a mouse and a keyboard, but also mechanical and electronic interfaces implemented in the device, and a type and form thereof are not particularly limited as long as a user command may be input. The electronic interface includes a display allowing touch input.

The processor 140, as a type of central processing unit, may execute one or more instructions stored in the memory 120 to control other components in the apparatus 100 so that the method of training the unsupervised conditional generative model according to the embodiment is performed.

For example, the processor 140 may refer to a data processing device embedded in hardware having a physically structured circuit to perform a function expressed as code or an instruction included in a program.

Examples of such a data processing device embedded in hardware may include a microprocessor, a central processing unit (CPU), a processor core, a multiprocessor, an application-specific integrated circuit (ASIC), a field programmable gate array (FPGA), etc. However, the present disclosure is not limited thereto.

The processor 140 may include at least one processor. The processor 140 may include at least one processor disposed in a plurality of computing devices.

The learning processor 150 may determine optimized model parameters of the artificial neural network by iteratively training the artificial neural network using various training techniques including the training method according to the present disclosure. In the present disclosure, an artificial neural network, parameters of which are determined by being trained using training data, may be referred to as a training model or a trained model.

The learning processor 150 may include one or more memory units configured to store data received, detected, generated, predefined, or output by other components, devices, terminals in the apparatus 100, and devices communicating with the terminals, and may include a memory integrated or implemented in the terminal. Alternatively or additionally, the learning processor 150 may be implemented using a memory associated with a terminal, such as an external memory directly coupled to the terminal or a memory maintained in a server communicating with the terminal.

In another embodiment, the learning processor 150 may be implemented using a memory maintained in a cloud computing environment or another remote memory location accessible by a terminal using a communication method such as a network. In general, the learning processor 150 may be configured to store data in one or more databases in order to identify, index, categorize, manipulate, store, retrieve, and output data for use in supervised or unsupervised learning, data mining, predictive analytics, or other devices.

A latent distribution 10 according to an embodiment of the present disclosure will be described with reference to FIG. 4.

The latent distribution 10 is a space for sampling latent vectors to be used as input data of a generative model, and may be defined as including a plurality of component distributions 11. At this time, the latent distribution may be parameterized with a mean vector, a covariance, and a mixing coefficient of each component distribution. The mixing coefficient determines a mixing ratio between the respective components included in the latent distribution.

As parameters for determining the latent distribution 10 in the present disclosure, a mean vector $\mu$, a covariance matrix $\Sigma$, and a mixing coefficient $\pi$ are configured as a mean vector $\mu_c$, a covariance matrix $\Sigma_c$, and a mixing coefficient $\pi_c$ of each component, and when K components are present, mean vectors, covariance matrices, and mixing coefficients thereof may be expressed as the following Equation 1.

$$\mu = \{\mu_c\}_{c=1}^{K},\ \sum = \left\{\sum\nolimits_c\right\}_{c=1}^{K},\ \text{and}\ \pi = \{\pi_c\}_{c=1}^{K} \quad \text{[Equation 1]}$$

In one embodiment, the distributions of the components may be defined as continuous Gaussian distributions, and in this instance, the latent distribution may be defined as a Gaussian mixture obtained by synthesizing the Gaussian distributions of the respective components.

Figure 4:
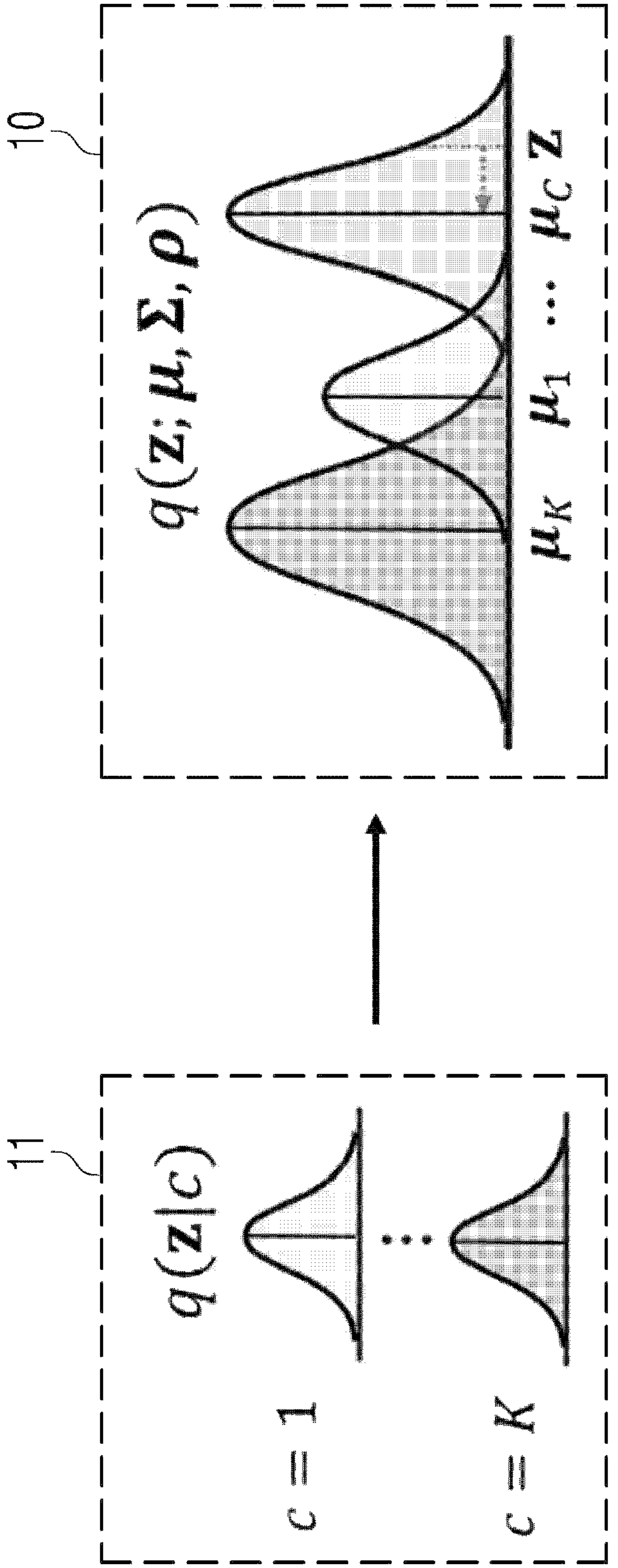
FIG. 4 is a diagram for describing a configuration of a latent distribution according to an embodiment of the present disclosure.

FIG. 4 illustrates a latent distribution including K components from c=1 to c=K, and illustrates the case where each component forms a Gaussian distribution, and the latent distribution is a Gaussian mixture. At this time, q(z|c) denotes a distribution of each component, q(z) and q(z; $\mu$, $\Sigma$, $\rho$) each denote a latent distribution, and $\rho$ denotes a parameterized mixing coefficient. In one embodiment, the latent distribution q(z) may be defined as Equation 2 below. At this time, in the present disclosure, p(c) may be expressed as a mixing coefficient $\pi_c$.

$$q(z) = \sum\nolimits_{c=1}^{K} p(c)q(z|c) \quad \text{[Equation 2]}$$

Figure 5:
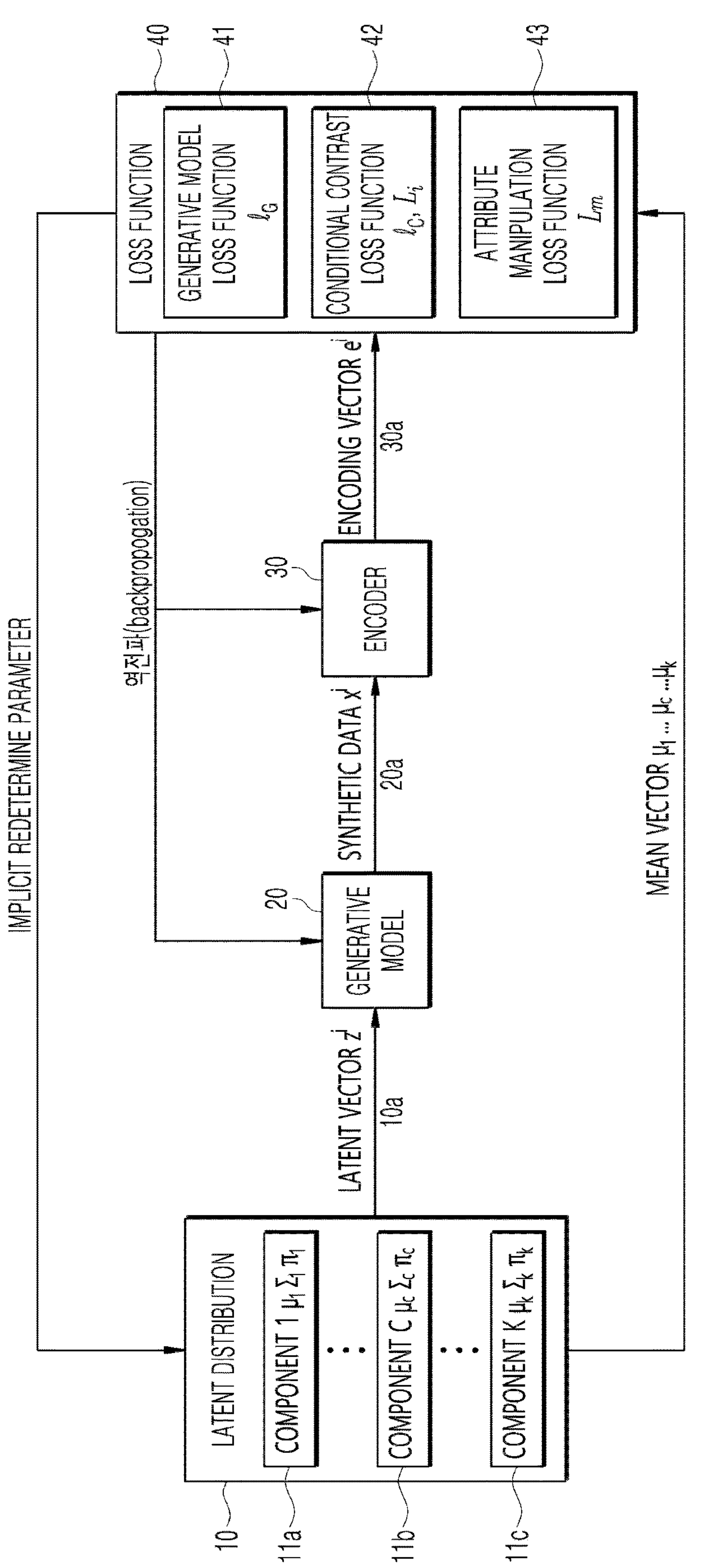
FIG. 5 is a block diagram for describing a training process of the unsupervised conditional generative model according to an embodiment of the present disclosure.

A description will be given of a process of training the generative model according to an embodiment of the present disclosure with reference to FIG. 5.

The generative model may be trained using the latent distribution 10, a generative model 20, an encoder 30, and a loss function 40.

In one embodiment, the latent distribution may be defined as a Gaussian mixture, and parameters $\mu$, $\Sigma$, and $\pi$ of the latent distribution, and parameters of each component are set to initial values prior to training. When the number of components is K, the mixing coefficient $\pi_c$ may be set to 1/K.

A latent vector 10*a* is an input value of the generative model, sampled from the latent distribution q(z) 10 in which distributions of a plurality of components are present, is data having a lower dimension than that of synthetic data 20*a* generated by the generative model, and may include salient attributes of real data.

The generative model 20 may generate the high-dimensional synthetic data 20*a* by receiving input of the latent vector 10*a* defined as low-dimensional. The generative model 20 is a deep learning-based artificial neural network training model, and includes a model trained using given real data or a distribution of real data to generate synthetic data, which is similar to real data and is new data. The generative model 20 may typically utilize a GAN, a VAE, a diffusion model, etc.

The trained generative model 20 may generate the synthetic data, which is similar to and is not the same as real data, by randomly sampling the latent vector 10*a* from the latent distribution 10 trained by redetermining parameters and inputting the latent vector 10*a* to the generative model 20.

The encoder 30 includes an artificial neural network based on deep learning, and may have a CNN, RNN, or MLP structure. Preferably, an encoder network has a CNN structure when the learned real data is an image, an RNN structure when the learned real data is time series data, and an MLP structure when the learned real data is data including a table.

The encoder 30 may output a low-dimensional encoding vector 30*a* by compressing the high-dimensional synthetic data 20*a*. In this instance, the encoding vector 30*a* may be output in the same dimension as that of the latent vector 10*a*, and loss function values may be calculated for the encoding vector 30*a* and the latent vector 10*a*.

The encoding vector 30*a* acquired through the encoder 30 may perform a function of extracting an attribute of the synthetic data 20*a* by compressing the synthetic data 20*a* to a low dimension, and learn parameters of the artificial neural network included in the encoder 30 through a backpropagation process.

In one embodiment, the encoder 30 may additionally utilize a contrastive loss function such as SimCLR, and in this way, in the case of learning image data, it is possible to avoid learning a low-level attribute such as background color.

The loss function 40 is configured such that a distribution of synthetic data 30*a* generated by the generative model 30 through training becomes similar to a distribution of training data. At this time, as training of the generative model 20 and the encoder 30 proceeds so that loss calculated through the loss function 40 is minimized, the distribution of the synthetic data 30*a* may become similar to the distribution of the real data. At this time, the loss function is configured so that the synthetic data 30*a* is closer to the real data, and through contrast between the encoding vector 30*a* and mean vectors of the plurality of components, the encoding vector 30*a* is closer to a mean vector of one component and farther from mean vectors of the other components.

When the generative model 30 is a GAN, the generative model 30 may be configured based on output of a discriminant model adversarially trained with respect to the generative model 30 to distinguish between real data and synthetic data.

The loss function 40 may include a generative model loss function $\ell_G$ or $L_i$ 41 and an unsupervised conditional contrastive loss function $\ell_C$ 42. In another embodiment, the loss function 40 may further include an attribute manipulation loss function $L_M$ 43 in the presence of labeled data.

The generative model loss function 41 may be configured so that the synthetic data 20*a* is closer to the real data, the unsupervised conditional contrastive loss function 42 may be configured so that the encoding vector 30*a* is closer to a mean vector of one component among a plurality of components 11 and farther from mean vectors of the other components, and in the presence of labeled data, the attribute manipulation loss function $L_M$ 43 may be configured so that an encoding vector for the encoded labeled data is closer to a mean vector of at least one component and farther from mean vectors of the other components.

In one embodiment, the generative model 30 may be based on a GAN, and in this instance, the generative model loss function 41 may be based on a loss function of a generative model expressed by [Equation 3] below for one latent vector 10*a*.

$$\ell_G(z^i) = -D(G(z^i)) \quad \text{[Equation 3]}$$

$\ell_G$ denotes the generative model loss function 41, $z^i$ denotes the latent vector 10*a*, D denotes the discriminant model, and G denotes the generative model 20. The discriminant model may be adversarially trained with respect to the generative model 20 to distinguish between the real data and the synthetic data 20*a*.

In another embodiment, when the generative model 30 is a VAE-based model, the loss function of the generative model may be a function expressed by Equation 4 below for one latent vector 10*a*.

$$L_i(\phi, \theta, x_i) = -\mathbb{E}_{q_\phi(z|x_i)}[\log(p_\theta(x_i|z))] + KL(q_\phi(z|x_i)\|p(z)) \quad \text{[Equation 4]}$$

$L_i$ denotes the generative model loss function according to the present embodiment, $x_i$ denotes ith training data, Z denotes the latent vector 10, p(z) denotes the latent distribution 10, $p_\theta$ denotes a decoder of the VAE, and $q_\phi$ denotes an encoder of the VAE. At this time, θ and ϕ denote parameters of the decoder of the VAE and the encoder of the VAE, respectively.

Through introduction of the loss function of [Equation 4], training may be performed so that the generated synthetic data 20*a* becomes similar to the real data (the first term of Equation 4), and an approximate distribution of the encoder may be configured to be closer to the prior distribution p(z) (the second term of Equation 4).

The unsupervised conditional contrastive loss function 42 may be configured so that the encoding vector 30*a* is closer to a mean vector 10*b* of one component among a plurality of components and farther from mean vectors 10*b* of the other components.

In this instance, the one component may be determined based on responsibility of the latent vector 10*a* and each of the plurality of components, and a component having the highest responsibility with respect to the latent vector 10*a* may be determined as the one component. In addition, an equation for obtaining the one component may be determined as the following [Equation 5].

$$C^i = \arg\max_c p(c|z^i) \quad \text{[Equation 5]}$$

$p(c|z^i)$ denotes responsibility of a component c for the latent vector 10*a*. [Equation 6] below may be used to determine an unsupervised conditional contrastive loss function and mean vectors for the remaining components.

$$C^j = \arg\max_c p(c|z^j) \quad \text{[Equation 6]}$$

At this time, $z^j$ denotes another latent vector in a mini-batch of size B, and $p(c|z^j)$ denotes responsibility for the latent vector 10*a* and each component c.

In the present disclosure, a mean vector of one component configured such that the encoding vector 30*a* is closer may be expressed as $$\mu_C^i,$$

and a mean vector of a component determined based on responsibility with another latent vector in a mini-batch of size B may be expressed as $$\mu_C^i.$$

In this case, the unsupervised conditional contrastive loss function may be a function expressed by the following [Equation 7].

$$\ell_C(z^i) = -\log\frac{\exp(\cos\theta_{ii})}{\frac{1}{B}\sum_{j=1}^{B}\exp(\cos\theta_{ij})} \quad \text{[Equation 7]}$$

Here, $\cos\theta_{ii}$ denotes cosine similarity between an encoding vector $e^i$ and $$\mu_C^i,$$

and $\cos\theta_{ij}$ denotes cosine similarity between the encoding vector $e^i$ and $$\mu_C^j.$$

A component having high responsibility with the latent vector $z^i$ in a mini-batch defined in a latent distribution based on such an unsupervised conditional contrastive loss function is set to a component to which $z^i$ belongs, and the latent distribution may be updated so that a mean vector $$\mu_C^i$$

of the component to which $z^i$ belongs is closer, and mean vectors $$\mu_C^j$$

of the remaining components are farther.

In one embodiment of the present disclosure, a total loss function including the unsupervised conditional contrastive loss function and the loss function of the generative model may be expressed by the following [Equation 8].

$$L = \frac{1}{B}\sum_{i=1}^{B}\left(\ell_G(z^i) + \lambda\ell_C(z^i)\right) \quad \text{[Equation 8]}$$

λ is a hyperparameter and may be determined by a user. In this way, the generative model 20 and the encoder 30 may be trained using the loss function 40 including the generative model loss function 41 and the unsupervised conditional contrastive loss function 42 at an appropriate ratio.

In another embodiment, when labeled data is present, the loss function 40 may further include the attribute manipulation loss function $L_M$ 43 so that the generative model 20 may learn salient attributes of labeled data.

The loss function 40 may further include the attribute manipulation loss function 43 configured such that at least one component among the plurality of components is similar to a distribution for attributes labeled in such data.

At this time, the attribute manipulation loss function 43 may be expressed in the form of the following [Equation 9].

$$L_M = \frac{1}{M}\sum_{i=1}^{M} -\log\frac{\exp\left(\cos\theta_c^i\right)}{\sum_{k=1}^{K}\exp\left(\cos\theta_k^i\right)} \quad \text{[Equation 9]}$$

In M pieces of labeled data $$x_c^i \ (i = 1, 2, \ldots, M), \cos\theta_c^i$$

is cosine similarity between a vector $$E(x_c^i)$$

obtained by encoding $$x_c^i$$

through the encoder 30 and a mean vector $\mu_c$ of the c-th component determined to be similar to a distribution for attributes in data, and $$\cos_k^i$$

is cosine similarity between the vector $$E(x_c^i)$$

obtained by encoding $$x_c^i$$

through the encoder 30 and a mean vector $\mu_k$ of a kth component. In this way, a vector $$E(x_c^i)$$

encoded by inputting the labeled data $$x_c^i$$

to the encoder 30 may be set to be closer to a mean vector $\mu_c$ of a cth component and farther from mean vectors $\mu_k$ of the remaining components.

In addition, the amount of labeled data may be augmented by applying a mix-up technique for labeled data. Even when the amount of labeled data is small, the component of the latent distribution may be induced to learn an attribute of the data.

A method of training the encoder and the generative model may be performed through a technique of optimizing parameters of the artificial neural network of the encoder and the generative model based on deep learning.

Hereinafter, a method of redetermining parameters of the latent distribution 10 will be described in detail. The method of redetermining the parameters of the latent distribution includes a process of redetermining the parameters $\mu_c$, $\Sigma_c$ and $\pi_c$ for the plurality of components 11, and redetermining the latent distribution 10 determined therethrough.

The process of redetermining the parameters of the latent distribution may determine an update direction of each parameter based on an estimated gradient of the loss function, and the gradient estimated at this time may refer to a gradient obtained by approximating gradients $\nabla_{\mu_c}\mathcal{L}$, $\nabla_{\Sigma_c}\mathcal{L}$ and $\nabla_{\rho_c}\mathcal{L}$ of the loss function 40 for the parameters $\mu_c$, $\Sigma_c$ and $\pi_c$ of each component distribution.

It is possible to perform a method of expressing a relationship between the estimated gradient of the loss function 40 according to an embodiment of the present disclosure and a gradient $\nabla_{z^i}\ell(z^i)$ for $z^i$ of the loss function 40 based on Stein's lemma, and in this way implicit reparameterization may be performed.

According to a method of implicit reparameterization according to an embodiment of the present disclosure, each of the mean vectors of the plurality of components 11 may be redetermined as shown in the following [Equation 10].

[Equation 10]

$$\mu_c \leftarrow \mu_c - \gamma\frac{1}{B}\sum_{i=1}^{B}\delta(z^i)_c\pi_c\nabla_{z^i}\ell(z^i)$$

$$\delta(z^i)_c = p(z^i \mid c)/p(z^i)$$

At this time, $\gamma$ denotes a learning rate, and $\ell(z^i)$ denotes the loss function 40.

According to the method of implicit reparameterization according to the embodiment of the present disclosure, a covariance matrix is defined as a symmetric matrix and may be redetermined using a method of obtaining a valid covariance matrix so that a positive definite matrix is retained. In one embodiment, redetermination of the covariance matrix may be expressed in the form of the following [Equation 11].

[Equation 11]

$$S_{z^i} = \delta(z^i)_c\pi_c\sum\nolimits_c^{-1}(z^i - \mu_c)\nabla_{z_i}^T\ell(z^i)$$

$$\Delta\sum\nolimits_c = -\frac{1}{4B}\sum_{i=1}^{B}(S_{z^i} + S_{z^i}^T)$$

$$\sum\nolimits_c \leftarrow \sum\nolimits_c + \gamma\left(\Delta\sum\nolimits_c + \frac{\gamma}{2}\Delta\sum\nolimits_c\sum\nolimits_c^{-1}\Delta\sum\nolimits_c\right)$$

According to the method of implicit reparameterization according to the embodiment of the present disclosure, a mixing coefficient of each component may be redetermined while the mixing coefficient is prevented from being negative and the sum of mixing coefficients of all components present in the latent distribution 10 remains 1. Redetermination of a mixing coefficient according to an embodiment may be expressed in the form of the following [Equation 12].

[Equation 12]

$$\rho_c \leftarrow \rho_c - \gamma\frac{1}{B}\sum_{i=1}^{B}\pi_c(\delta(z^i)_c - 1)\ell_G(z^i)$$

$$\pi_c = \frac{\exp(\rho_c)}{\sum_{i=1}^{K}\exp(\rho_i)}$$

At this time, K denotes the number of components present in the latent distribution 10. Since the mixing coefficient is learned through [Equation 12], even when attributes in a dataset are imbalanced, a ratio thereof may be learned to perform unsupervised conditional generation.

FIG. 6 illustrates illustrative pseudocode of a method of training the unsupervised conditional generative model according to an embodiment of the present disclosure. The pseudocode illustrated in FIG. 6 illustrates the case where the generative model is a GAN model as an example.

In line 1, a mean vector, a covariance matrix, and a mixing coefficient and initial values of parameters of a discriminant model, a generative model, and an encoder are set.

In line 2 to line 19, each parameter is learned so that a loss function is minimized.

In line 3 and line 4, a mini-batch of size B is determined, and a latent vector belonging to each mini-batch is sampled from the latent distribution.

In line 5 to line 8, a loss function for a latent vector z, is calculated.

In line 9 to line 15, parameters of the latent distribution (the mean vector, the covariance matrix, and the mixing coefficient of each component) are updated.

In line 16 to line 18, the parameters of the generative model, the discriminant model, and the encoder are updated.

Figure 7A:
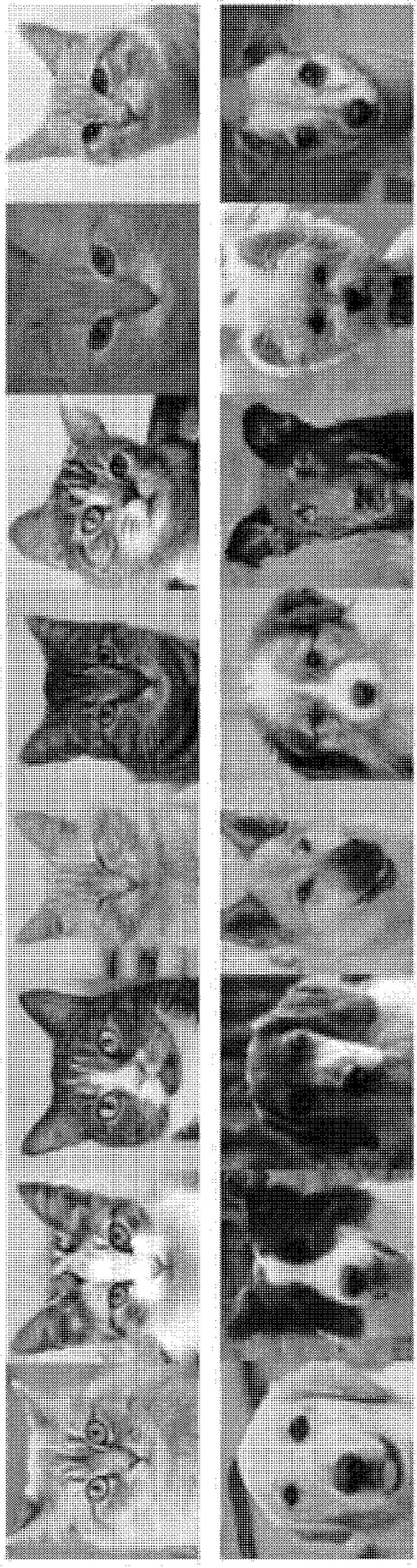
FIG. 7A is image data generated by a generative model trained by the method of training the unsupervised conditional generative model according to an embodiment of the present disclosure, and illustrates the case where a ratio of cat images to dog images in training data is 1:1.
Figure 7B:
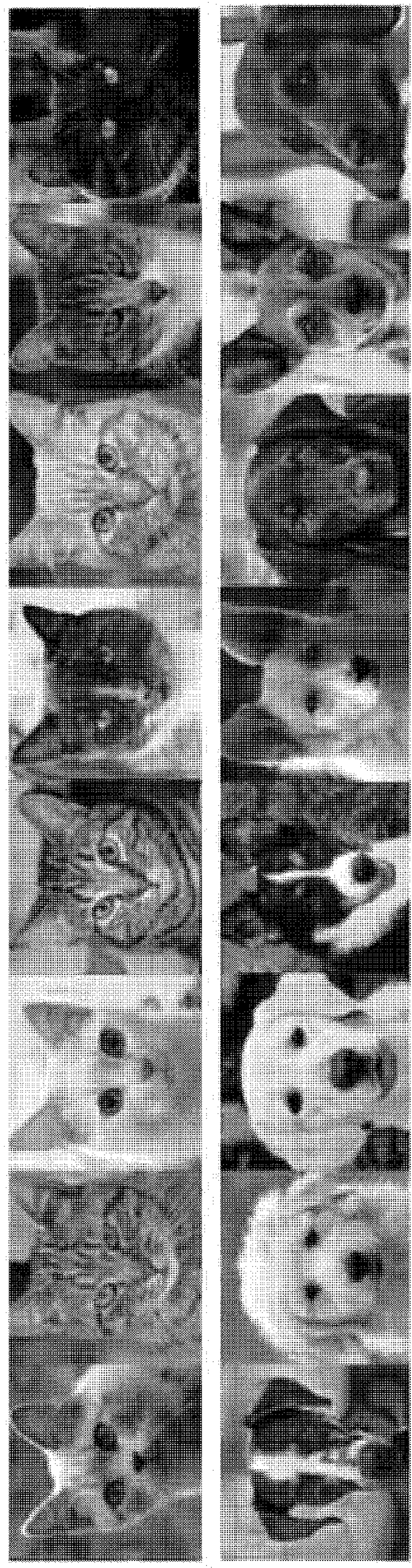
FIG. 7B is image data generated by the generative model trained by the method of training the unsupervised conditional generative model according to an embodiment of the present disclosure, and illustrates the case where a ratio of cat images to dog images in training data is 1:2.
Figure 7C:
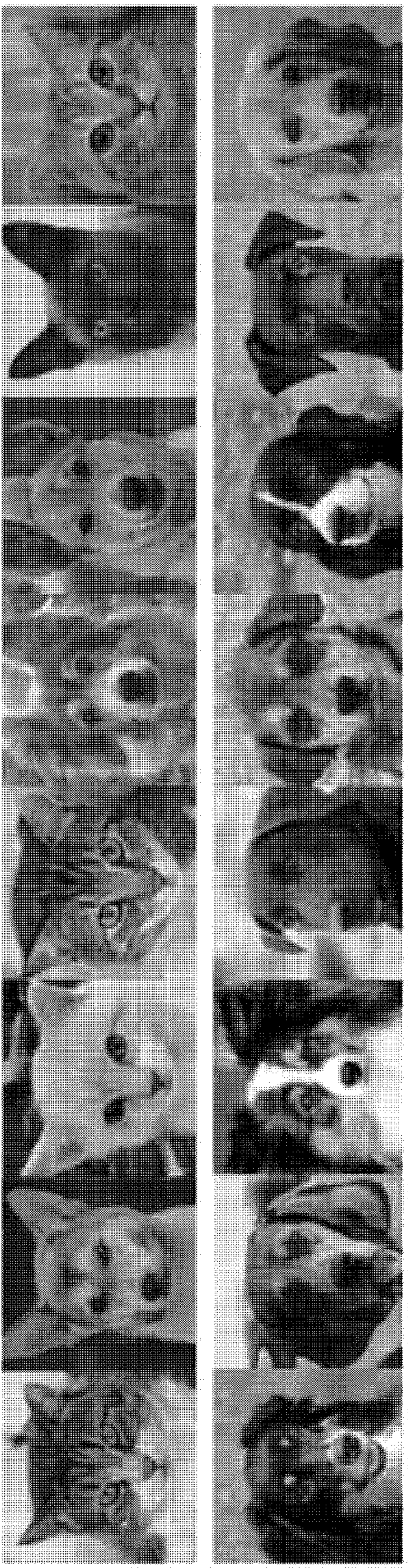
FIG. 7C is image data generated by the generative model trained by the method of training the unsupervised conditional generative model according to an embodiment of the present disclosure, and illustrates the case where a ratio of cat images to dog images in training data is 1:5.

FIGS. 7A, 7B, and 7C illustrate images of cats and dogs generated based on a trained generative model according to an embodiment of the present disclosure, and illustrate synthetic data of the generative model trained when a ratio of cats to dogs appearing in training data is 1:1 (FIG. 7A), 1:2 (FIG. 7B), and 1:5 (FIG. 7C).

Referring to FIGS. 7A and 7B, it can be confirmed that images are generated by robustly learning attributes of cats and dogs when the ratio of cats to dogs in the training data is 1:1 and 1:2.

Referring to FIG. 7*c*, since the ratio of cat images in the training data is small, it can be confirmed that an image is generated by learning unfolded ears as a salient attribute rather than an attribute of a cat.

FIG. 8 illustrates illustrative pseudocode of the method of training the unsupervised conditional generative model when labeled data is present according to an embodiment of the present disclosure.

In line 1 and line 2, data for a component in which a salient attributed desired to be learned is present and data in which a salient attributed desired to be learned is not preset in training data are stored.

In line 3 to line 6, labeled data is augmented by applying a mix-up technique.

In line 7 to line 12, a value of cosine similarity between a mean vector of each component and an encoding vector of labeled data is calculated.

In line 13 and line 14, parameters of the encoder, the generative model, and the latent distribution are learned based on an attribute manipulation loss function.

FIG. 9 illustrates synthetic data of a generative model trained according to a method of designating and learning an attribute that may be learned by the generative model by introducing an attribute manipulation loss function when labeled data is present according to an embodiment of the present disclosure.

In training the generative model, various attributes in training data are learned as salient attributes. For example, in the case of an image of a human face, in addition to male and female salient attributes, skin color, background color, etc. may be learned as a salient attribute.

The synthetic data illustrated in FIG. 9 is a synthetic image synthesized by the generative model trained by the method according to the present embodiment when there is male and female labeled data, and it can be seen that the male and female salient attributes are well learned, which is a result of manipulating distributions of two components so that male and female attribute distributions are learned through the attribute manipulation loss function. Further, it can be confirmed that training is robust even when a ratio of males to females is imbalanced at 1:1.7.

A method and apparatus for training an unsupervised conditional generative model according to embodiments of the present disclosure may efficiently train a generative model even when a distribution of salient attributes in training data is uneven.

A method and apparatus for training an unsupervised conditional generative model according to embodiments of the present disclosure may efficiently train the generative model using salient attributes through a small number of pieces of labeled data even when only the data is present.

A method and apparatus for training an unsupervised conditional generative model according to embodiments of the present disclosure may train the generative model using a salient attribute of labeled data intended by a user when the labeled data is present in training data.

A method and apparatus for training an unsupervised conditional generative model according to embodiments of the present disclosure may robustly train the generative model even when salient attributes are imbalanced through gradient estimates of mixing coefficients of a plurality of components included in a latent distribution.

Effects of the present disclosure are not limited to those mentioned above, and other effects not mentioned herein will be clearly understood by those skilled in the art from the above description.

The present disclosure described above may be implemented as computer-readable code in a medium on which a program is recorded. A computer-readable medium includes all types of recording devices in which data readable by a computer system is stored. Examples of computer-readable medium include a hard disk drive (HDD), a solid state drive (SSD), a silicon disk drive (SDD), a ROM, a RAM, a CD-ROM, a magnetic tape, a floppy disk, an optical data storage device, etc. In addition, the computer may include the processor of each device.

Meanwhile, the program may be specially designed and configured for the present disclosure, or may be known and available to a person skilled in the art in the field of computer software. Examples of programs may include not only machine language code generated by a compiler but also high-level language code executable by a computer using an interpreter, etc.

In the specification of the present disclosure (especially in the claims), the use of the term "the" and similar denoting terms may correspond to both singular and plural. In addition, when a range is described in the present disclosure, an invention to which an individual value included in the range is applied is included (unless stated otherwise), which is equivalent to describing each individual value included in the range in the detailed description of the invention.

Unless an order is explicitly stated or stated to the contrary for steps included in the method according to the present disclosure, the steps may be performed in any suitable order. The present disclosure is not necessarily limited to the described order of the steps. All examples or exemplary terms (for example, etc.) in this disclosure are simply used to describe the present disclosure in detail, and the scope of the present disclosure is not limited due to the examples or exemplary terms unless limited by the claims. In addition, a person skilled in the art may appreciate that various modifications, combinations and changes may be made according to design conditions and factors within the scope of the appended claims or equivalents thereto.

Therefore, the spirit of the present disclosure should not be limited to the above-described embodiments, and it should be understood that not only the following claims, but also all ranges equivalent to or equivalently modified from these claims belong to the scope of the spirit of the present disclosure.

What is claimed is:

1. A processor-implemented method of training an unsupervised conditional generative model, the method comprising:

defining distributions of a plurality of components including mean vectors, respectively, and sampling a latent vector from a latent distribution including the distributions of the plurality of components;

generating synthetic data using the latent vector as input of the generative model;

inputting the synthetic data to an encoder to acquire an encoding vector;

training the generative model and the encoder based on a value of a loss function configured to make the synthetic data closer to real data, wherein the loss function includes a generative model loss function and an unsupervised conditional contrastive loss function, and the unsupervised conditional contrastive loss function is configured so that the encoding vector is closer to a mean vector of one component determined based on responsibility with the latent vector among the plurality of components and farther from mean vectors of the other components; and redetermining parameters of the latent distribution based on the value of the loss function, wherein the parameters of the latent distribution include mixing coefficients for the plurality of component distributions, and the redetermining of the parameters comprises redetermining parameters for the plurality of component distributions and the mixing coefficients based on an estimated gradient of the loss function.

2. The method according to claim 1, wherein the distributions of the components are defined as Gaussian distributions, and the latent distribution is a Gaussian mixture in which the Gaussian distributions of the respective components are synthesized.

3. The method according to claim 1, wherein the unsupervised conditional contrastive loss function is configured based on cosine similarity between the encoding vector and the mean vectors of the plurality of components.

4. The method according to claim 1, wherein:

the loss function is based on output of a discriminant model for the synthetic data; and the discriminant model is adversarially trained with respect to the generative model to distinguish between the real data and the synthetic data.

5. The method according to claim 1, further comprising encoding labeled data through the encoder when the labeled data is present, wherein the loss function is configured so that the encoded labeled data is closer to a mean vector of at least one of the components and farther from mean vectors of the other components.

6. The method according to claim 5, further comprising applying a mix-up technique for the labeled data.

7. The method according to claim 5, wherein the loss function further includes an attribute manipulation loss function configured such that at least one component among the plurality of components is similar to a distribution for attributes of the labeled data.

8. The method according to claim 1, wherein the estimated gradient of the loss function is computed based on implicit reparameterization using Stein's lemma, such that a gradient with respect to parameters of the latent distribution is expressed in terms of a gradient of the loss function with respect to the latent vector.

9. The method according to claim 1, wherein the redetermining of the mixing coefficients is performed such that each mixing coefficient is prevented from being negative and a sum of the mixing coefficients of all components remains a predefined number.

10. The method according to claim 1, wherein the redetermining of the parameters further comprises updating covariance matrices of the plurality of component distributions based on the estimated gradient of the loss function, such that a positive definite matrix property of the covariance matrices is retained.

11. An apparatus for training an unsupervised conditional generative model, the apparatus comprising:

a processor; and a memory operably connected to the processor to store at least one piece of code executed by the processor, wherein, when executed by the processor, the memory stores code causing the processor to:

define distributions of a plurality of components including mean vectors, respectively, and sample a latent vector from a latent distribution including the distributions of the plurality of components;

generate synthetic data using the latent vector as input of the generative model;

input the synthetic data to an encoder to acquire an encoding vector;

train the generative model and the encoder based on a value of a loss function configured to make the synthetic data closer to real data, wherein the loss function includes a generative model loss function and an unsupervised conditional contrastive loss function, and the unsupervised conditional contrastive loss function is configured so that the encoding vector is closer to a mean vector of one component determined based on responsibility with the latent vector among the plurality of components and farther from mean vectors of the other components; and redetermine parameters of the latent distribution based on the value of the loss function, wherein the parameters of the latent distribution include mixing coefficients for the plurality of component distributions, and the redetermining of the parameters comprises redetermining parameters for the plurality of component distributions and the mixing coefficients based on an estimated gradient of the loss function.

12. The apparatus according to claim 11, wherein the distributions of the components are defined as Gaussian distributions, and the latent distribution is a Gaussian mixture in which the Gaussian distributions of the respective components are synthesized.

13. The apparatus according to claim 11, wherein the unsupervised conditional contrastive loss function is configured based on cosine similarity between the encoding vector and the mean vectors of the plurality of components.

14. The apparatus according to claim 11, wherein:

the loss function is based on output of a discriminant model for the synthetic data; and the discriminant model is adversarially trained with respect to the generative model to distinguish between the real data and the synthetic data.

15. The apparatus according to claim 11, wherein:

when labeled data is present, the memory further stores code causing the processor to encode the labeled data through the encoder; and the loss function is configured so that the encoded labeled data is closer to a mean vector of at least one of the components and farther from mean vectors of the other components.

16. The apparatus according to claim 15, wherein the memory further stores code causing the processor to apply a mix-up technique for the labeled data.

17. The apparatus according to claim 15, wherein the loss function further includes an attribute manipulation loss function configured such that at least one component among the plurality of components is similar to a distribution for attributes of the labeled data.

18. The apparatus according to claim 11, wherein the estimated gradient of the loss function is computed based on implicit reparameterization using Stein's lemma, such that a gradient with respect to parameters of the latent distribution is expressed in terms of a gradient of the loss function with respect to the latent vector.

19. The apparatus according to claim 11, wherein the redetermining of the mixing coefficients is performed such that each mixing coefficient is prevented from being negative and a sum of the mixing coefficients of all components remains a predefined number.

20. The apparatus according to claim 11, wherein the redetermining of the parameters further comprises updating covariance matrices of the plurality of component distributions based on the estimated gradient of the loss function, such that a positive definite matrix property of the covariance matrices is retained.

* * * * *